United States Patent [19]

Suzuki et al.

[11] Patent Number: 5,128,767
[45] Date of Patent: Jul. 7, 1992

[54] ELECTRONIC STILL CAMERA

[75] Inventors: Masahiro Suzuki, Yokohama; Norihiko Takatsu, Tokyo; Tetsuya Yamamoto, Hasuda, all of Japan

[73] Assignee: Nikon Corporation, Tokyo, Japan

[21] Appl. No.: 407,614

[22] Filed: Sep. 15, 1989

[30] Foreign Application Priority Data

Sep. 20, 1988 [JP] Japan .................. 63-235349

[51] Int. Cl.⁵ .......... H04N 3/14; H04N 5/335
[52] U.S. Cl. .......... 358/213.13; 358/213.18; 358/909
[58] Field of Search ........... 358/213.11, 209, 221, 358/213.16, 909, 213.18, 213.13, 213.19, 213.22; 354/242

[56] References Cited

U.S. PATENT DOCUMENTS

| 4,298,264 | 11/1981 | Ishil | 354/242 |
| 4,754,333 | 6/1988 | Nara | 358/909 |
| 4,760,452 | 7/1988 | Kaneko et al. | 358/909 |
| 4,912,558 | 3/1990 | Easterly et al. | 358/213.16 |
| 4,914,518 | 4/1990 | Suga | 358/213.16 |
| 4,972,267 | 11/1990 | Kameko et al. | 358/213.22 |

Primary Examiner—James J. Groody
Assistant Examiner—Safet Metjahic
Attorney, Agent, or Firm—Shapiro and Shapiro

[57] ABSTRACT

In an electronic still camera having a solid-state image pickup device and a mechanical shutter, the interval from the start of charge accumulation to the start of charge readout for odd and even fields may be different, resulting in flicker or line crawl effects. To overcome this problem, the intervals are made the same by detecting the level of a reference signal synchronized with the operation of the shutter, determining whether the levels are the same when the shutter is opened and when the shutter is closed, and, if they are not the same, preventing the application of transfer gate signals to the image pickup device for a predetermined period.

5 Claims, 4 Drawing Sheets

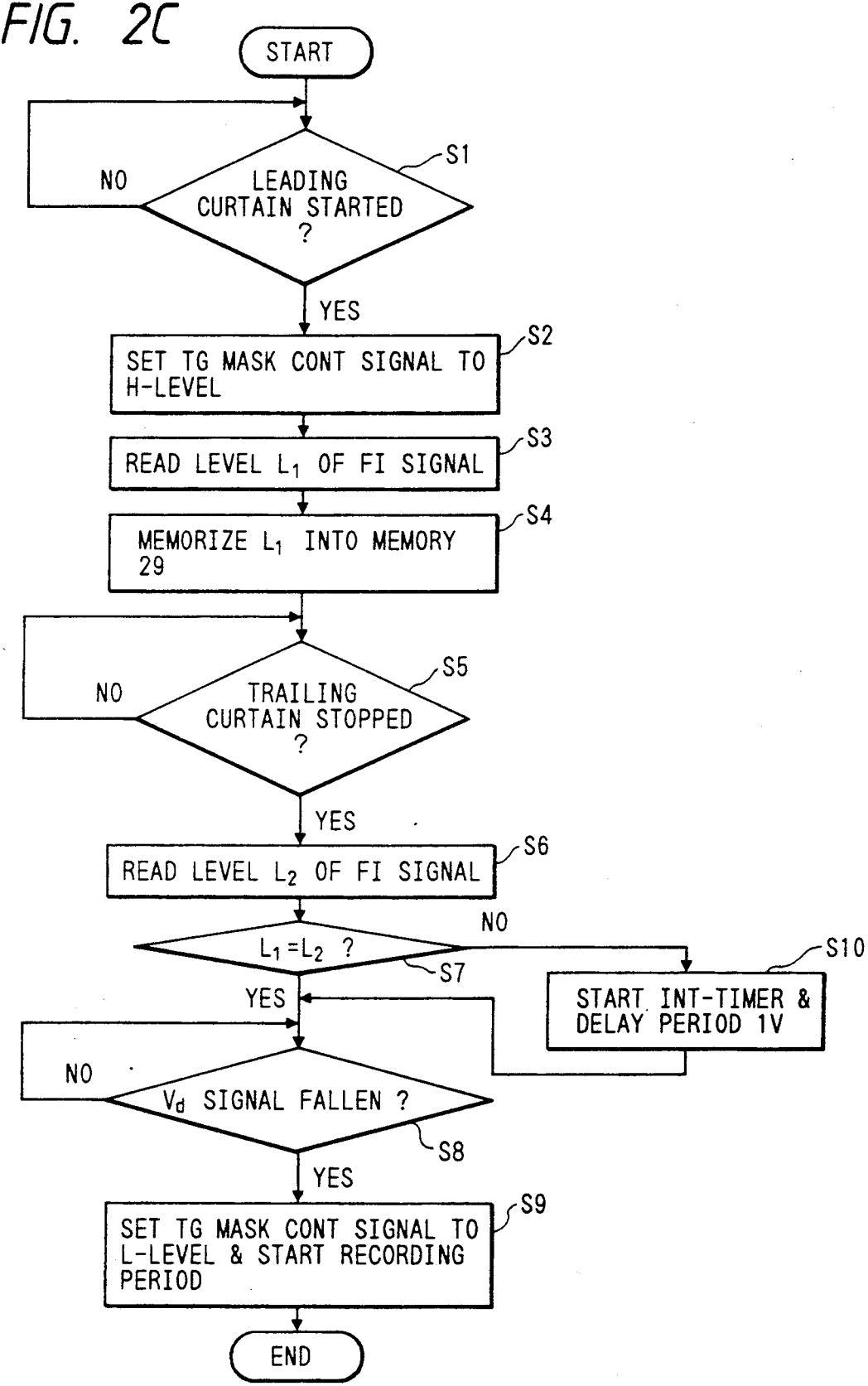

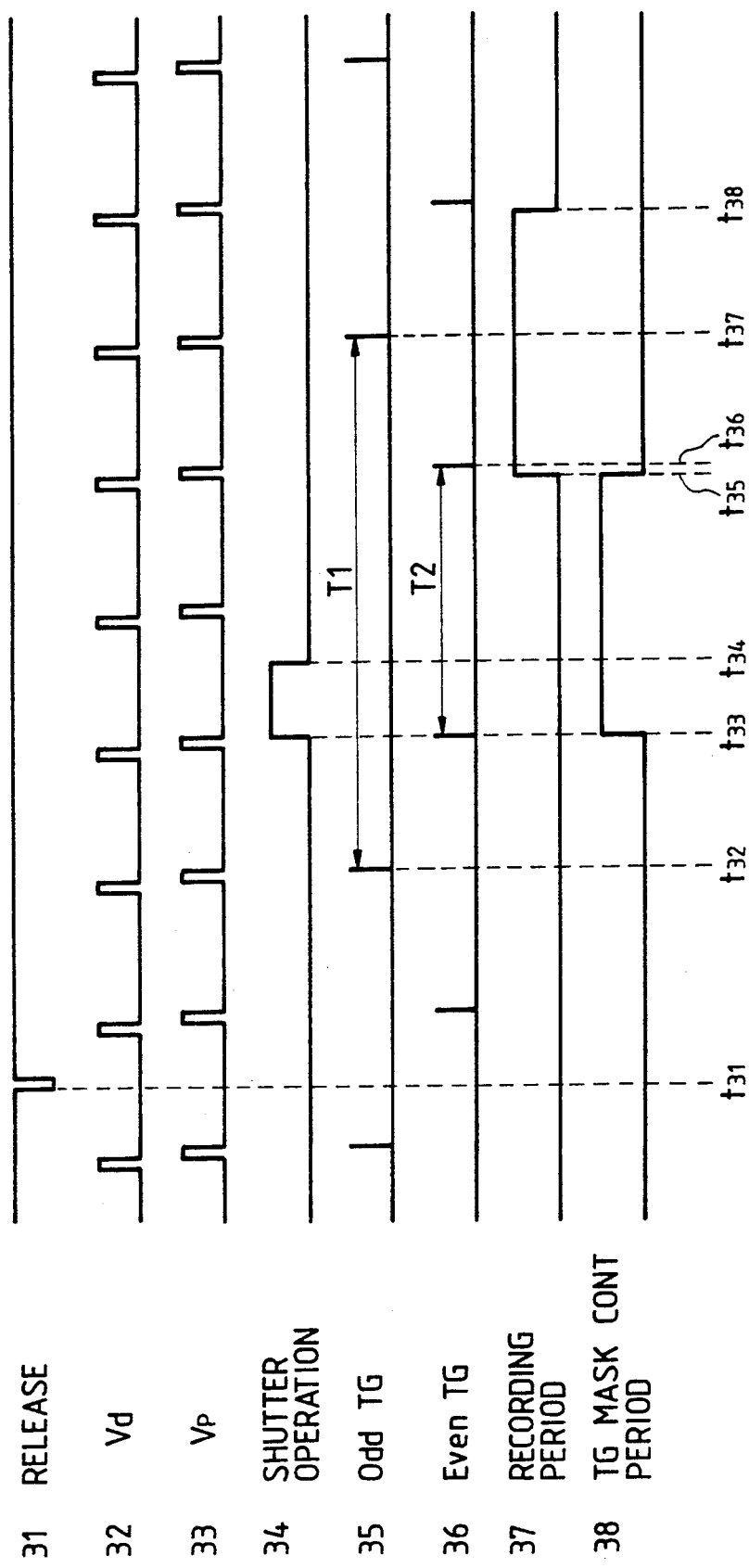

ELECTRONIC STILL CAMERA

BACKGROUND OF THE INVENTION

1. Field of the Invention

The present invention relates to an electronic still camera in which the exposure time for a solid-state image sensor is controlled by a mechanical shutter.

2. Related Background Art

In a conventional electronic still camera in which the exposure time for a solid state image sensor is controlled by a mechanical shutter, the control operation is conducted according to a timing chart shown in FIG. 3, which shows an example of an interline transfer CCD (IT-CCD) as the solid-state image sensor.

In FIG. 3 there are shown a release signal 31, a vertical synchronization signal (Vd) 32, a signal (Vp) 33 delayed by about 700 μs from the vertical synchronization signal Vd, a shutter operation signal 34 of which upshift and downshift respectively trigger the leading and trailing shutter curtains, a transfer gate (TG) pulse 35 for an odd field, and a transfer gate (TG) pulse 36 for an even field. The TG pulse 35 or 36 is a charge readout signal for each field, for transferring the charges of the light-receiving unit of the IT-CCD to the vertical transfer unit, has a pulse duration shorter than that of the signal Vp and is positioned within the duration of the signal Vp. There are further shown a recording period 37 for recording a frame image in the recording unit of the IT-CCD by field signal reading, and a mask control period 38 in which the charge transfer from the light-receiving unit to the vertical transfer unit by the TG pulses 35, 36 is prohibited.

Thus, in the conventional electronic still camera, in response to the entry of the release signal 31 at a time t31, the Vp signal 33 is given after a predetermined time (required for preparations for photographing such as mirror lifting) to start the running of the leading shutter curtain to initiate the exposure of the light-receiving unit of the IT-CCD. At t34, after the lapse of an arbitrary shutter time, the running of the trailing shutter curtain is started to complete the exposure operation. Subsequent to the completion of running of the trailing shutter curtain, when the mask control period ends at a time t35 in synchronization with the downshift of a pulse Vd, the signal readout is started in synchronization with the downshift, at a time t36, of an immediately following Vd signal 32. More specifically the signal charge transfer of an even field is started by a TG pulse 36 at the time t36, then the signal charge transfer of an odd field is started by a TG pulse 35 at a time t37, and a frame recording is completed at a time t38.

However, in such conventional drive control of the electronic still camera, if the shutter time is selected as shown in FIG. 3 for photographing an object with a high sensitivity, the time from the start of accumulation to the start of signal readout is a time T1 from t32 to t37 for an odd field but a time T2 from t33 to t36 for an even field, which are mutually different by two vertical periods (2 V=ca. 22 ms).

Such difference in the time from the start of charge accumulation to the start of charge readout between an odd field and an even field gives rise to a difference, between the odd field and the even field, in the amount of accumulated charge in the CCD due to the influence of dark current, eventually resulting in a flicker in case of interlaced reproduction of the recorded frame image on a television set, or in a density difference between neighboring lines, called line crawl, when the recorded frame image is transmitted and printed.

SUMMARY OF THE INVENTION

In consideration of the foregoing, an object of the present invention is to provide an electronic still camera free from image quality deterioration such as flicker in the reproduced image or line crawl in the transmitted and printed image, even in exposure for an arbitrary time with a mechanical shutter.

The above-mentioned object can be attained according to the present invention, by an electronic still camera provided with a solid-state image sensor capable of taking a frame image composed of an odd field and an even field, a mechanical shutter for defining the exposure time of said solid-state image sensor, and a recording unit for recording a frame image by reading a field image at a time in synchronization with the vertical synchronization signal from the solid-state image sensor, comprising control means for controlling the start timing of signal readout from the solid-state image sensor in such a manner that the time from the start of charge accumulation to the start of charge readout, including the exposure period by the mechanical shutter, is equal for the odd and even fields.

In the electronic still camera of the present invention having the above-mentioned structure, the charge readout from the IT-CCD in synchronization with the vertical synchronization signal is started from the odd or even field which is at first subjected to charge accumulation in the exposure period, so that the time from the start of charge accumulation to the start of charge readout is made equal for both fields. Thus the influence of dark current on the amount of accumulated charge is made the same for both fields, so that it is possible to securely prevent the flicker in the interlaced reproduction of the recorded frame image and the line crawl phenomenon in the transmitted and printed image.

BRIEF DESCRIPTION OF THE DRAWINGS

FIG. 2C is a flow chart showing the control sequence thereof; and

FIG. 3 is a timing chart showing the control function of a conventional apparatus.

DESCRIPTION OF THE PREFERRED EMBODIMENTS

Figure 2A:
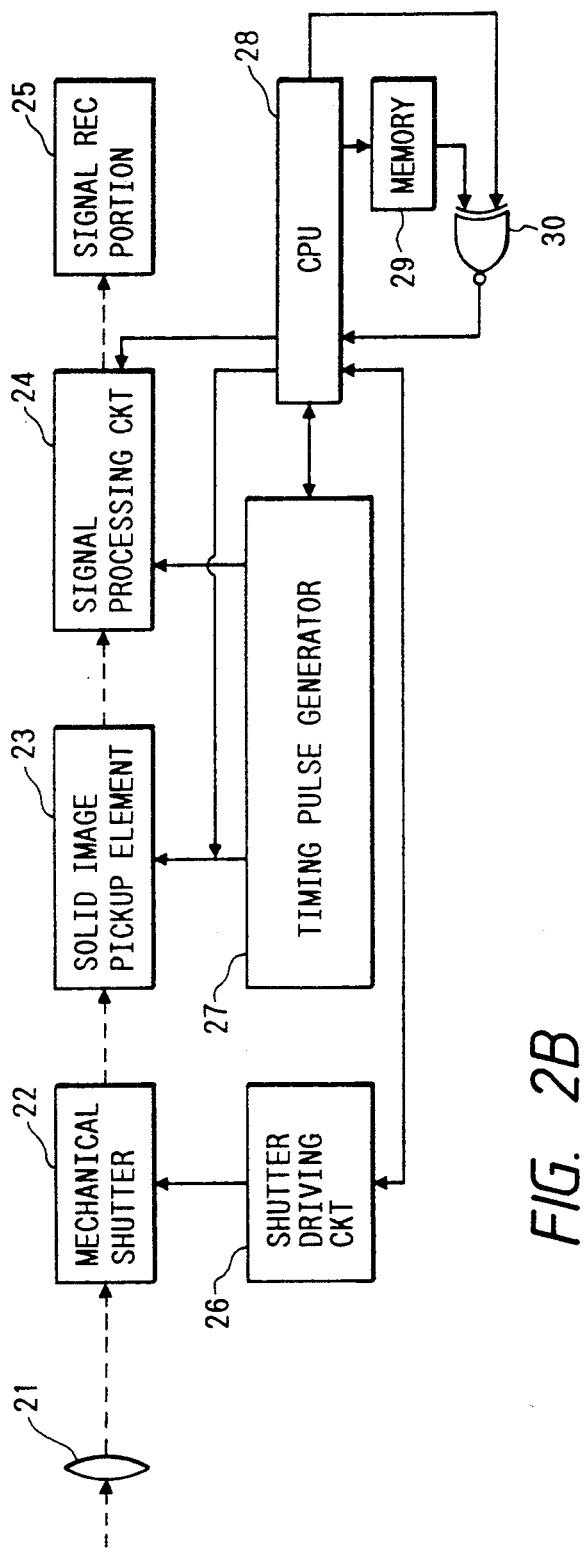
FIG. 2A is a block diagram of an embodiment of the present invention.

FIG. 2A is a block diagram of an embodiment of the electronic still camera of the present invention.

In FIG. 2A there are provided a photographing lens 21, a mechanical shutter 22, and a solid-state image pickup device 23, which is composed, for example, of an interline transfer (IT) CCD.

In such photographing optical system, the light entering from the photographing lens 21 reaches the light-receiving unit of the solid-state image pickup device 23 when the mechanical shutter 22 is opened.

A signal processing circuit 24 effects a predetermined processing on signal charges read from the solid-state image pickup device 23. A signal recording unit 25, for recording the signals obtained from the signal processing circuit 24, can be composed of a suitable recording medium such as a disk or a semiconductor memory.

There are further provided a driving circuit 26 for the mechanical shutter 22, and a timing pulse generator 27 for generating transfer gate pulses (odd and even TG pulses), vertical transfer pulses and horizontal transfer pulses, for controlling the solid-state image pickup device 23.

A CPU 28 controls the entire electronic still camera. In the electronic still camera of the present invention, the CPU 28 has a control function for controlling the start timing of signal charge readout by the timing pulse generator 27 in such a manner that the time from the start of charge accumulation to the start of charge readout to the signal recording unit 25, including the exposure time by the mechanical shutter 22, becomes equal for the odd field and the even field. There are further provided a memory 29 for storing the state of a field identification (FI) signal, and an exclusive OR gate 30.

The recording timing control for obtaining an equal time, from the start of charge accumulation to the start of charge readout, for the odd field and the even field of the solid-state image pickup device 23 can be achieved by the CPU 28, as will be explained later, by discriminating whether the field immediately before the opening of the mechanical shutter 22 is the same as that at the completion of running of the trailing shutter curtain, and starting the charge readout in response to the first vertical synchronization signal after the shutter closing if the fields are the same, or delaying the charge readout by a vertical period if the fields are different.

Figure 2B:
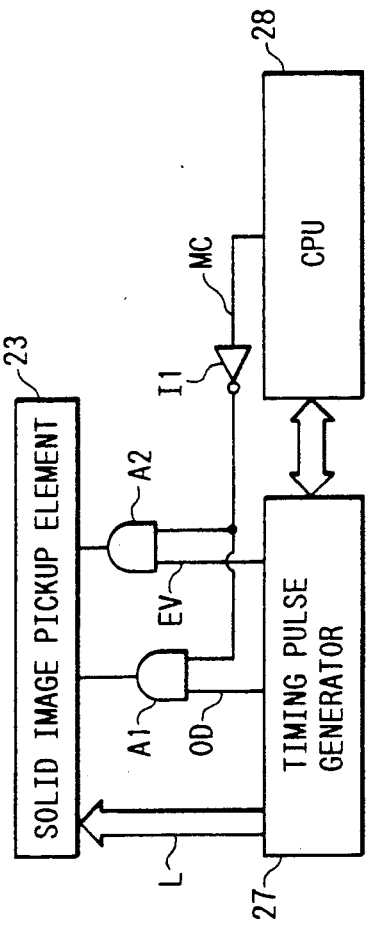
FIG. 2B is a circuit diagram thereof.

FIG. 2B is a circuit diagram showing the connection among the solid-state image pickup device 23, timing pulse generator 27 and CPU 28 shown in FIG. 2A. The vertical transfer pulse signals and the horizontal transfer pulse signals are sent from the timing pulse generator 27 to the solid-state image pickup device 23, through a signal line L. Also signal lines OD, EV are connected from the timing pulse generator 27 to the solid-state image pickup device 23, respectively through AND gates A1, A2, for respectively transmitting odd TG pulses and even TG pulses. Also the CPU 28 outputs the TG mask control signal through an inverter I1 and a signal line MC connected to the AND gates A1, A2. As will be apparent from the foregoing explanation, the odd and even TG pulses generated from the timing pulse generator 27 are not transmitted to the solid-state image pickup device 23 when the TG mask control signal from the CPU 28 is at the high-level state, but are transmitted to the image pickup device 23 only when the mask control signal is at the low-level state.

In the following there will be explained the function of the embodiment shown in FIG. 2, with reference to a timing chart shown in FIG. 1.

Figure 1:
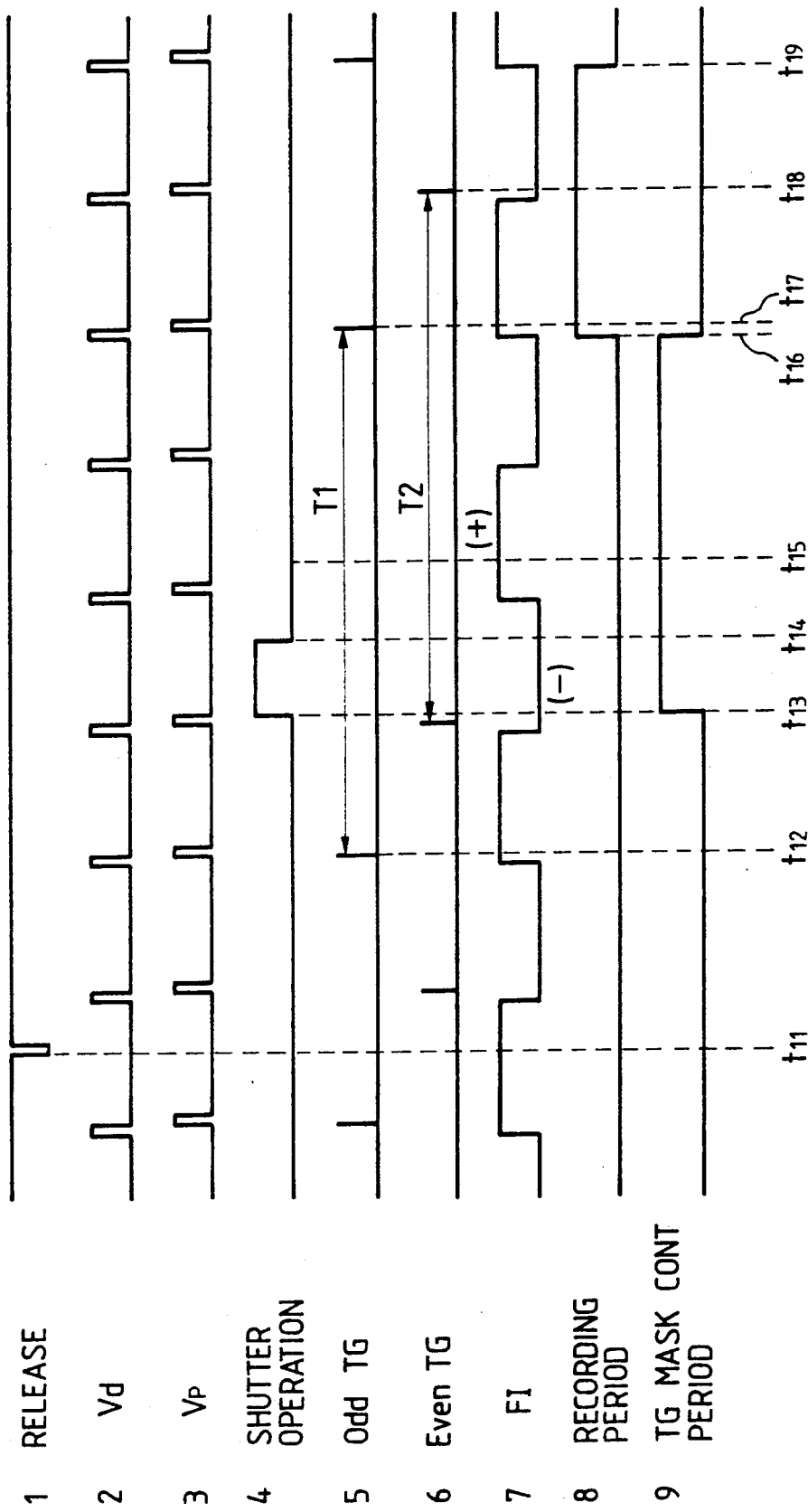
FIG. 1 is a timing chart showing the control function of the present invention.

In FIG. 1 there are shown a release signal 1 for the mechanical shutter 22, a vertical synchronization signal (Vd) 2 for driving the solid-state image pickup device 23, a signal (Vp) 3 delayed by about 700 μs from the vertical synchronization signal Vd, a shutter operation signal 4 of which upshift and downshift respectively trigger the leading and trailing shutter curtains, a transfer gate (TG) pulse 5 for an odd field, and a transfer gate (TG) pulse 6 for an even field. These pulses are used for transferring the charges of the light-receiving unit of the IT-CCD constituting the solid-state image pickup device 23, and are positioned between the Vd signal 2 and the Vp signal 3.

There is newly added a field identification (FI) signal 7 for the control of the electronic still camera of the present invention. The FI signal inverts polarity or level in synchronization with the Vd signal 2, and, in the present embodiment, indicates an odd field or an even field respectively by the positive or negative polarity.

There are further shown a recording period 8 for the signal recording unit 25, and a mask control period 9 of the transfer gate pulses 4, 5 for the solid-state image pickup device.

In the following there will be explained the control procedure of the electronic still camera shown in FIG. 2A, with reference to the timing chart shown in FIG. 1.

At first, in response to the release signal 1 entered at a time t11, the running of the leading shutter curtain is started, in synchronization with the signal Vp, at a time t13 after a predetermined period during which are conducted preparatory operations such as mirror lifting and dark current elimination of the solid-state image pickup device. In this manner the mechanical shutter 22 is opened to initiate the exposure of the light-receiving unit of the solid-state image pickup device 23. Then the running of the trailing shutter curtain is started at a time t14 after the lapse of the predetermined shutter time. Then the running of the trailing shutter curtain is completed at a time t15, and the exposure control of the solid-state image pickup device 23 is thus completed.

The polarity of the signal FI at the time t13 when the running of the leading shutter curtain starts is stored in the memory 29, and the XOR gate 30 discriminates whether the polarity coincides with that of the signal FI at the time t15 when the running of the trailing shutter curtain is completed.

In the present example, the FI signal at the time t13 has a negative (−) polarity, indicating an even field, while that at the time t15 has a positive (+) polarity indicating an odd field, so that different fields are identified. When the circuit 30 thus identifies different fields at the times t13 and t15, a high-level signal is sent to the CPU 28 to prohibit the signal readout by the first even TG pulse 6 obtained after the time t15, whereby the recording period is delayed by a vertical cycle, or an interval of the Vd signal 2. More specifically, the mask control period 9, started at the time t13, is extended by 1 V period until the time t16.

When the recording is started from the time t16 by the above-mentioned extension of the mask control period, a TG pulse 5 for transferring the signal charges of the odd field, of which accumulation is started at first at the time t12, to the vertical transfer unit is generated at a time t17 immediately after the time t16, so that the signal readout from the odd field of which charge accumulation is at first started at the time t12 is started from the time t17.

Subsequently a TG pulse 6 for transferring the signal charges of the even field, of which accumulation is started immediately before the time t13, to the vertical transfer unit is obtained at a time t18, so that the signal readout of the even field is started at time t18. In this manner the recording of a frame image into the signal recording unit 14 is finally completed at a time t19.

Consequently the time from the start of charge accumulation to the start of signal readout for an odd field is equal to T1 from t12 to t17. On the other hand, that for an even field is equal to T2 from t13 to t18, so that either period is about equal to 4 V and both substantially coincide mutually. Since the time from the start of exposure to the start of signal readout is equal in the even and odd fields, the influence of dark current on the signal charges is the same in both fields. It is therefore possible to securely prevent the flicker, caused by different influences of the dark current on the odd and even fields, in the interlaced reproduction of the frame image stored in the recording unit 14, or the line crawl phenomenon when the frame image stored in the recording unit 14 is transmitted and printed.

On the other hand, if the polarity of the FI signal at the time t13 is the same as that at the time t15, corresponding to the case of a same field, there are not conducted the delay of the recording period 8 by 1 V and the signal readout by the extension of the mask control period by 1 V, and the signal readout is conducted in synchronization with the first odd or even TG pulse 5 or 6 obtained after the completion of running of the trailing shutter curtain.

The FI signals 7 for field identification have the same polarity when a short shutter time is defined by the shutter operation signal 4. In such case the running of the trailing shutter curtain is completed within the even field period represented by the FI signal of the time t13 shown in FIG. 1, whereby the FI signal at the time t13 and that at the time t15 at the completion of running of the trailing shutter curtain have the same polarity, and the signal readout in this case is started from a field for which the charge accumulation is conducted at first, in synchronization with the first TG pulse obtained after the closing of the shutter as in the conventional system shown in FIG. 3, without the delay of 1 V explained above.

In the following there will be explained the control sequence of the mask control signal of the present embodiment, with reference to FIG. 2C. When the control sequence is started, a step S1 discriminates whether the running of the leading shutter curtain has been started, and, if started (t13 in FIG. 1), a step S2 shifts the mask control signal to the high level. Then a step S3 identifies the level of the FI signal, and a step S4 stores said level in the memory 29. Subsequently a step S5 discriminates whether the running of the trailing shutter curtain has been completed, and, if completed (t15 in FIG. 1), a step S6 identifies the level of the FI signal. Then a step S7 compares the level of the FI signal stored in the memory 29 with that of the FI signal entered in the step S6, and, if both levels are the same, a step S8 discriminates whether the Vd signal has shifted down, and, if already shifted down, a step S9 shifts the mask control signal to the low level, thereby starting the recording period and terminating the control sequence.

On the other hand, if the step S7 identifies that the levels of the FI signals are different, a step S10 starts an internal timer, incorporated in the CPU 28, and the sequence proceeds to a step S8 after a delay by a period 1 V. Subsequently steps S8 and S9 effect the operations explained above.

After the mask control period is terminated by the above-explained control sequence, the period T1 is terminated by a first odd TG signal, and the period T2 is terminated by a first even TG signal after the end of the mask control period.

In the electronic still camera of the present invention, the signal readout is started from a field in which the exposure is started at first, regardless of the length of the shutter time of the mechanical shutter 22, so that the time from the start of exposure to the start of signal readout is maintained in the odd field and in the even field, thereby securely preventing the flicker in the image reproduction on a television set or the line crawl in the transmitted and printed image.

Though the foregoing embodiment has been limited to a single photographing operation of the electronic still camera, the present invention is naturally applicable likewise to the continuous photographing operation.

Also instead of the memory 29 and the exclusive OR circuit 30, these functions may be achieved inside the CPU 28.

As explained in the foregoing, the present invention, capable of always maintaining the time from the start of charge accumulation to the start of signal readout in a solid-state image pickup device the same for the odd field and the even field, can securely prevent the flicker, caused by the influence of the dark current, when the recorded frame image is reproduced on a television set, or the line crawl phenomenon when the recorded frame image is transmitted and printed, thereby providing a reproduced image of a high image quality.

We claim:

1. An electronic still camera comprising:

solid-state image pickup means of charge accumulation type for generating image signals;

an optical system for focusing light from an object onto said image pickup means;

recording means for recording said image signals on a recording medium;

shutter means positioned between said image pickup means and said optical system, and having a leading curtain member and a trailing curtain member;

driving means for driving said leading curtain member and said trailing curtain member, thereby exposing said image pickup means to light coming from the object and transmitted through said optical system;

generator means for alternately generating, with a predetermined interval, a first timing signal for causing said image pickup means to output image signals of an odd field, and a second timing signal for causing said image pickup means to output image signals of an even field, and also generating a reference signal alternately varying between two levels with said predetermined interval, said levels indicating the odd field and the even field, respectively; and control means for controlling the input of said first and second timing signals into said image pickup means and thereby controlling the charge accumulation times for the image signals of the odd field and for the image signals of the even field of said image pickup means;

wherein said control means is adapted to detect the level of said reference signal in approximate synchronization with the start of running of said leading curtain member and the level of said reference signal in approximate synchronization with the completion of running of said trailing curtain member, and, if the detected reference signal levels are different, to output a prohibition signal for prohibiting the entry of said first and second timing signals into said image pickup means for a period substantially equal to said predetermined interval, so that the charge accumulation times for the image signal of the odd field and for the image signals of the even field of said image pickup means are substantially equal, and said recording means is adapted to record image signals on said recording medium in response to the termination of said prohibition signal.

2. An electronic still camera comprising:

solid-state image pickup means of charge accumulation type for generating image signals;

an optical system for focusing light from an object onto said image pickup means;

recording means for recording said image signals on a recording medium;

shutter means positioned between said image pickup means and said optical system, and having a leading curtain member and a trailing curtain member;

driving means for driving said leading curtain member and said trailing curtain member, thereby exposing said image pickup means to light coming from the object and transmitted through said optical system;

generator means for alternately generating with a predetermined interval, a first timing signal for causing said image pickup means to output image signals of an odd field, and a second timing signal for causing said image pickup means to output image signals of an even field, and also generating a reference signal alternately varying between two levels with said predetermined interval, said levels indicating the odd field and the even field, respectively; and control means for controlling the input of said first and second timing signals into said image pickup means and thereby controlling the charge accumulation times for the image signals of the odd field and for the image signals of the even field of said image pickup means;

wherein said control means is adapted to detect the level of said reference signal in approximate synchronization with the start of running of said leading curtain member and the level of said reference signal in approximate synchronization with the completion of running of said trailing curtain member, and, if the detected reference signal levels are different, to output a prohibition signal for prohibiting the entry of said first and second timing signals into said image pickup means for a period substantially equal to said predetermined interval, and said recording means is adapted to record image signals on said recording medium in response to the termination of said prohibition signal, and wherein said control means comprises memory means, and is adapted to store the level of said reference signal, detected in approximate synchronization with the start of running of said leading curtain member, in said memory means, and to compare the level of said reference signal detected in approximate synchronization with the completion of running of said trailing curtain member with the content of said memory means.

3. An electronic still camera according to claim 2, wherein said control means comprises gate means for transmitting said first and second timing signals to said image pickup means, and is adapted, when the level of said reference signal detected in approximate synchronization with the completion of running of said trailing curtain member is different from the content of said memory means, to prohibit the transmission, by said gate means, of said first and second timing signals to said image pickup means, for a period substantially equal to said predetermined interval.

4. An electronic still camera according to claim 1, wherein said control means is adapted to permit entry of said first and second timing signals into said image pick up means if the detected levels of said reference signal are equal.

5. An electronic still camera according to claim 2, wherein said control means is adapted to permit entry of said first and second timing signals into said image pick up means if the detected levels of said reference signal are equal.

* * * * *